United States Patent
Moberg et al.

(10) Patent No.: US 9,113,453 B2
(45) Date of Patent: Aug. 18, 2015

(54) METHODS AND ARRANGEMENTS IN A RADIO COMMUNICATION SYSTEM

(75) Inventors: Peter Moberg, Stockholm (SE); Joakim Bergström, Stockholm (SE); Magnus Lindström, Sollentuna (SE); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1080 days.

(21) Appl. No.: 13/125,420

(22) PCT Filed: Apr. 30, 2010

(86) PCT No.: PCT/SE2010/050477

§ 371 (c)(1),
(2), (4) Date: Apr. 21, 2011

(87) PCT Pub. No.: WO2011/133081

PCT Pub. Date: Oct. 27, 2011

(65) Prior Publication Data

US 2011/0275381 A1  Nov. 10, 2011

Related U.S. Application Data

(60) Provisional application No. 61/327,161, filed on Apr. 23, 2010.

(51) Int. Cl.
*H04W 24/00* (2009.01)
*H04W 72/04* (2009.01)

(52) U.S. Cl.
CPC ................................. *H04W 72/0406* (2013.01)

(58) Field of Classification Search
CPC ................................................ H04W 72/0406

USPC ........... 455/420–422.1, 435.1–453, 464, 509, 455/515, 511; 370/328, 338, 331, 332
See application file for complete search history.

(56) References Cited

U.S. PATENT DOCUMENTS

2010/0080139 A1  4/2010  Palanki et al.
2014/0079005 A1  3/2014  McCoy et al.

FOREIGN PATENT DOCUMENTS

CN  101627656 A  1/2010
CN  101632323 A  1/2010
(Continued)

OTHER PUBLICATIONS

Huawei, "LTE non-CA based HetNet support", 3GPP TSG RAN WG1 meeting #60bis, Beijing, China, Apr. 12-16, 2010, R1-101982, Chapters 1, 2.1.
(Continued)

*Primary Examiner* — Babar Sarwar
(74) *Attorney, Agent, or Firm* — Coats & Bennett, P.L.L.C.

(57) ABSTRACT

An Uplink control channel resource Management Module (120, 130), referred to as "UMM", and a method in the UMM for assigning, to a radio network node 110, uplink control channel resources, referred to as "UCCHR", for use in a uplink control channel between the radio network node (110) and a communication device (160) are provided. The UMM obtains (210) resource allocation information, referred to as "RAI", and generates (220) a resource allocation command, referred to as "RAC", based on the RAI. The RAC indicates UCCHR to be used by the radio network node. Furthermore, the UMM provides (230) the RAC to the radio network node (110). Related methods and nodes to enable the UMM to assign UCCHR are also provided.

22 Claims, 9 Drawing Sheets

(56) References Cited

FOREIGN PATENT DOCUMENTS

| WO | 2010016698 | A2 | 2/2010 |
|----|------------|----|--------|
| WO | 2010104957 | A2 | 9/2010 |

OTHER PUBLICATIONS

HTC, "Performance of ICIC Enhancement by Channel Measurement in Relay Stations", 3GPP TSG-RAN WG1 #60 bis, Beijing, China, Apr. 12-16, 2010, R1-102461, Chapter 2.

CMCC, QUALCOMM Incorporated, Text proposal on LTE TDD HeNB interference control, 3GPP TSG-RAN, WG4 #AdHoc1, Sophia Antipolis, FR, Jan. 18-22, 2010, R4-100178, Chapters 1, 7.2.1.1, 7.2.12, 7.3.2.2.1.

NTT DOCOMO, "Downlink Interference Coordination Between eNodeB and Home eNodeB", 3GPP TSG RAN WG1 Metting #60, San Francisco, USA, Feb. 22-26, 2010, R1-101225, Chpaters 1, 2.1.

LG Electronics, "Methods to facilitate the inter-cell coordination in heterogeneous networks", 3GPP TSG RAN WG1 Metting #60bis, Beijing, China, Apr. 12-16, 2010, Chapters 1, 2.2.

NTT DOCOMO. "PUCCH Design for Carrier Aggregation in LTE-Advanced." 3GPP TSG RAN WG1 Meeting #58bis, R1-094238, Miyazaki, Japan, Oct. 12-16, 2009, pp. 1-4.

METHODS AND ARRANGEMENTS IN A RADIO COMMUNICATION SYSTEM

RELATED APPLICATIONS

This application claims priority to U.S. Provisional Patent App. No. 61/327,161, which was filed Apr. 23, 2010, and to International Patent App. No. PCT/SE2010/050477, which was filed Apr. 30, 2010, each of which is incorporated herein by reference in its entirety.

TECHNICAL FIELD

The present invention relates to methods and arrangements in a radio communication system. In particular, the present invention relates to a method and an Uplink control channel Management Module for assigning uplink control channel resource and related methods and nodes in the radio communication system.

BACKGROUND

In 3GPP (third generation partnership project), there has been a substantial activity related to heterogeneous networks, so called hetnets, during the past year. A hetnet deployment may be characterized in that such a system includes different access points with different downlink output power levels. Further, the heterogeneous network consists of a combination of various access points, such as macro eNBs, micro/pico eNBs, relays, femto/home eNBs, etc.

Micro/pico eNBs (or base stations) are typically assumed to have the same functionality as a macro eNB, but the micro/pico eNB uses a lower output power than the macro eNB. Relays can also be low power nodes, but they are mainly characterized by the fact that they are not directly connected to a wired backhaul, instead the relays transmit/receive data via a "donor eNB".

Femto/home eNBs are typically low power nodes for which it is possible to apply a concept of Closed Subscriber Group (CSG). If CSG is activated, only users included in the CSG are allowed to connect to such a femto/home eNB. Other users will be barred from that eNB.

Downlink power imbalance, together with an RSRP (reference symbol/signal received power) based cell selection, creates a situation where the path loss to a low power cell (for example a micro cell) is much lower than towards a high power cell (for example a macro cell). Nevertheless, a communication device (or a UE) connects to the high power cell (or eNB) since the received signal is stronger because of higher output power from the high power eNB than from the low power eNB (femto/home eNB).

Uplink power control in LTE is typically path loss based, which may lead to that users (i.e. communication devices) connected to a low power eNB suffer intolerably in the Uplink from high power eNB users' (communication devices') interference, which high power users (communication devices) are situated close to the low power eNB. In FIG. 1, there is shown an example, in which a low power eNB is represented by a micro cell and a high power eNB by a macro eNB.

From a system perspective, the interference problem is particularly severe on the uplink control channel, i.e. the PUCCH, since these signals are not re-transmitted. Further, ICIC schemes are traditionally designed with data channels in mind. A dysfunctional control channel leads to increased outage probability (coverage problems), degraded downlink and uplink throughput in the low power cells etc.

An even more challenging scenario is when the low power eNB (for example a pico eNB) is only available for CSG users. In that situation, the non-CSG user (communication device) creating interference towards the low power cell might be located just next to the access point.

SUMMARY

An object of the present invention is to reduce interference on an uplink control channel between a radio base station, such as eNB, and a communication device.

According to an aspect of the invention, the object is achieved by a method in an Uplink control channel resource Management Module, referred to as "UMM", for assigning, to a radio network node, uplink control channel resources, referred to as "UCCHR", for use in a uplink control channel, referred to as "UCCH", between the radio network node and a communication device. A radio communication system comprises the UMM, the radio network node and the communication device. The UMM obtains resource allocation information, referred to as "RAI". Further, the UMM generates a resource allocation command, referred to as "RAC", based on the RAI. The RAC indicates UCCHR to be used by the radio network node. Then, the UMM provides the RAC to the radio network node.

According to a further aspect of the invention, the object is achieved by an Uplink control channel resource Management Module, referred to as "UMM", for assigning, to a radio network node, uplink control channel resources UCCHR for use in a uplink control channel, referred to as "UCCH", between the radio network node and a communication device. A radio communication system comprises the UMM, the radio network node and the communication device. The UMM comprises an obtaining unit configured to obtain resource allocation information, referred to as "RAI", a processing unit configured to generate a resource allocation command, referred to as "RAC", based on the RAI. The RAC indicates UCCHR to be used by the radio network node. The UMM further comprises a providing unit configured to provide the RAC to the radio network node.

According to a further aspect of the invention, the object is achieved by a radio network node, comprising a UMM as described herein.

According to a further aspect of the invention, the object is achieved by a network node, comprising a UMM as described herein.

In this manner, coordination of UCCHR between cells which interfere with each other is introduced. By obtaining resource allocation information, it is possible to generate a resource allocation command, which indicates to the radio network node which Uplink control channel resources it may use in order to reduce interference on the uplink control channel. The generated RAC is then provided to the radio network node such that the radio network node may apply information, comprised in the RAC, to the communication device or other network nodes, such as radio network nodes or UMMs. As a result, the above mentioned object is achieved.

An advantage of the present solution is that reliable and/or robust (with respect to interference) uplink control channel transmission/reception may be obtained. Further, efficient resource allocation is obtained by the solution presented herein. The UMM may improve efficiency of the UL (uplink) radio resources and protect the UL control channels from an intolerable interference level.

According to another aspect of the invention, the object is achieved by a method in a radio network node for allocating resources to a communication device. A radio communication system comprises the radio network node, the communication device and a UMM. The radio network node obtains, from the UMM, a resource allocation command, referred to as "RAC". The RAC indicates UCCHR to be used by the radio network node. The radio network node selects resources to be allocated to the communication device based on the RAC. The resources comprise a sub-set of the UCCHR. The radio network node allocates the resources to the communication device.

According to a further aspect of the invention, the object is achieved by a radio network node for allocating resources to a communication device. A radio communication system comprises the radio network node, the communication device, and a UMM. The radio network node comprises an obtaining unit configured to obtain from the UMM, a resource allocation command, referred to as "RAC". The RAC indicates UCCHR to be used by the radio network node. The radio network node further comprises a processing unit configured to select resources to be allocated to the communication device based on the RAC. The resources comprise a sub-set of the UCCHR. The radio network node further comprises an allocating unit configured to allocate the resources to the communication device.

Advantageously, the radio network node is configured to handle RAC, provided to the radio network node by, for example, a UMM. Thus, the radio network node enables efficient usage of uplink control channel resources as determined by the UMM.

According to yet another aspect of the invention, the object is achieved by a method in a radio network node for providing, to a UMM, RAI for indicating UCCHR to be used in a uplink control channel, referred to as "UCCH", between the radio network node and a communication device. A radio communication system comprises the radio network node and the UMM. The radio network node measures parameters comprising one or more of region of the semi-static region of UCCH used for CQI and SR transmission, reserved region for Ack/Nack, indications of how much of the UCCHR are used, indications of the level of transmitted power on the used UCCHR, interference situation on UCCH resource blocks and potentially neighbouring resource blocks, an amount of intra-cell interference on UCCH, and information about cell coverage areas including possible overlap in coverage between different cells. Next, the radio network node generates RAI based on one or more of the parameters, and provides RAI to the UMM.

According to a further aspect of the invention, the object is achieved by a radio network node for providing, to a UMM, RAI for indicating UCCHR to be used in a uplink control channel, referred to as "UCCH", between the radio network node and a communication device. A radio communication system comprises the radio network node and the UMM. The radio network node comprises a measuring unit configured to measure parameters comprising one or more of region of the semi-static region of UCCH used for CQI and SR transmission, reserved region for Ack/Nack, indications of how much of the UCCHR are used, indications of the level of transmitted power on the used UCCHR, interference situation on UCCH resource blocks and potentially neighbouring resource blocks, an amount of intra-cell interference on UCCH, and information about cell coverage areas including possible overlap in coverage between different cells. The radio network node further comprises a processing unit configured to generate RAI based on one or more of the parameters, and a providing unit configured to provide RAI to the UMM.

Advantageously, the radio network node is configured to provide RAI to the UMM. Thus, the radio network node enables, by generating and providing the RAI to the UMM, the UMM to assign UCCH resources to radio network node efficiently, while still ensuring robustness and reliability of UCCH transmissions. The UMM assigns UCCH resources to the radio network node by means of RAC.

According to still another aspect of the invention, the object is achieved by a method in a network node for assigning UCCHR to a sub network node. A radio communication system comprises the network node, the sub network node and a UMM. The network node obtains from the UMM an obtained resource allocation command, referred to as "RAC". The obtained RAC indicates UCCHR to be used by the network node. Next, the network node generates a new RAC based on the obtained RAC. The new RAC indicates a selected set of UCCHR, which comprises a sub-set of the UCCHR indicated by the obtained RAC. Furthermore, the network node provides the new RAC to the sub network node.

According to a further aspect of the invention, the object is achieved by a network node, for assigning UCCHR to a sub network node. A radio communication system comprises the network node, the sub network node and a UMM. The network node comprises an obtaining unit configured to obtain, from the UMM, an obtained resource allocation command, referred to as "RAC". The obtained RAC indicates UCCHR to be used by the network node. The network node further comprises a processing unit configured to generate a new RAC based on the obtained RAC. The new RAC indicates a selected set of UCCHR for use by the sub network node, which comprises a sub-set of the UCCHR indicated by the obtained RAC. Moreover, the network node comprises a providing unit configured to provide the new RAC to the sub network node.

Hence, a RAC may also be based on a RAC obtained from another network node. In this manner, further decentralized improvement of resource usage may be achieved.

Further features of, and advantages with, the present invention will become apparent when studying the appended claims and the following description. It is to be understood that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
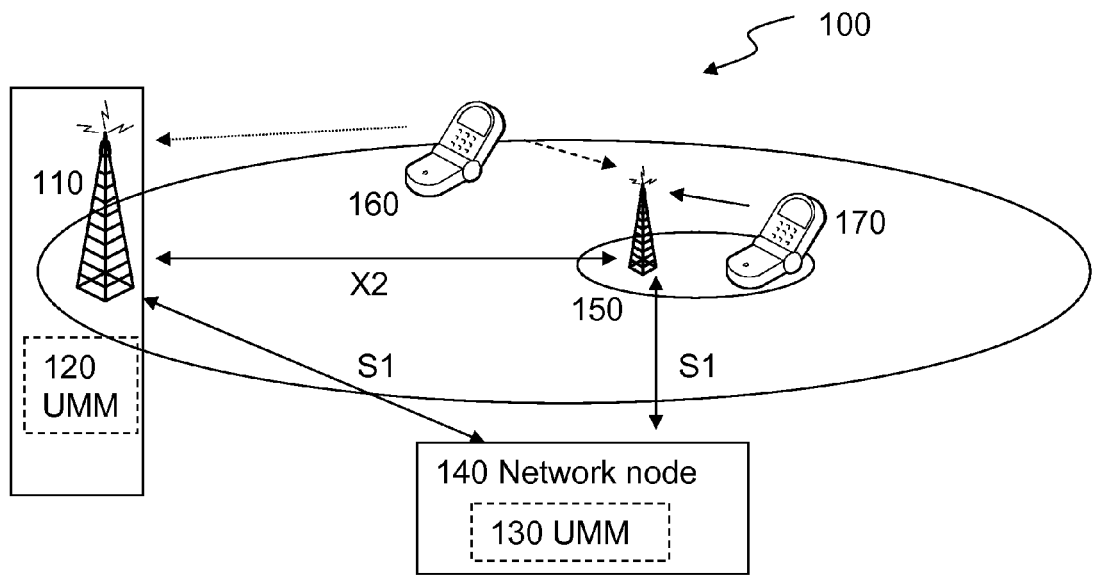
FIG. 1 shows a schematic overview of an exemplifying radio communication system in which the present solution may be implemented.

Throughout the following description similar reference numerals have been used to denote similar elements, parts, items or features, when applicable.

FIG. 1 shows a schematic overview of an exemplifying radio communication system 100 in which the present solution may be implemented. The radio communication system 100 comprises a radio network node 110, a network node 140, a further radio network node 150, a communication device 160 and a further communication device 170. The two communication devices 160, 170 are managed by the radio network node and the further radio network node 110, 150, respectively. An interface X2 is established between the radio network node 110 and the further radio network node 150. An interface S1 is established between the radio network node 110 and the network node 140. Other interfaces may also be used to transfer information between the radio network nodes and the network node. Moreover, the radio network node comprises an Uplink control channel resource Management Module, referred to as "UMM", 120. In this example, the UMM is comprised in the radio network node 110 or the network node 140, not both. In other examples, it is preferred to have several "levels" of UMMs as will be discussed, for example, in conjunction with FIG. 13. In the following, the radio communication system 100 may be an LTE system. Hence, terms used generally relate to those used when describing an LTE system. The UMM may be a software module or a hardware controller with ASICS.

It shall be noted that a radio network node may be a radio base station, an eNB or the like. In addition, it is to be understood that a radio base station manages at least one cell. Therefore, the expressions "cell", "radio network node" and "base station" may have been used interchangeably.

Figure 2A:
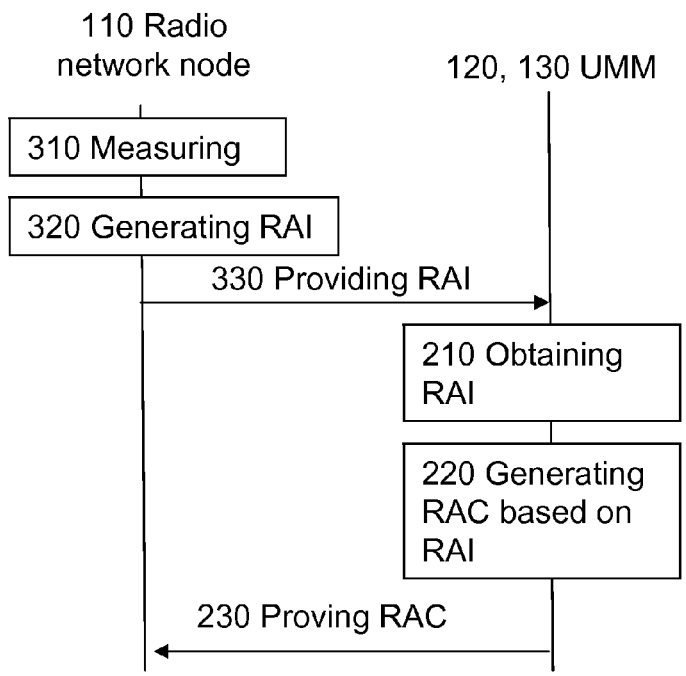
FIGS. 2a, 2b, 2c show schematic, combined signalling and flow charts of embodiments of methods in the radio communication system according to FIG. 1.

In FIG. 2a, there is shown a schematic, combined signalling and flow chart of an embodiment of the method according to the present invention, when implemented in the radio communication system 100 of FIG. 1. The following steps may be performed. Notably, in some embodiments of the method, the order of the steps may differ from what is indicated below.

310 Optionally, the radio network node 110 measures parameters, useable for generating RAI. Many different parameters may be used as is disclosed below.

320 Optionally, the radio network node 110 generates RAI based on the parameters, measured in step 310.

330 Optionally, the radio network node 110 provides the RAI to the UMM 120, 130.

210 The UMM 120, 130 obtains 210 RAI. The RAI may be obtained in many different manners as described, for example, with reference to FIGS. 2b and c.

220 The UMM 120, 130 generates RAC based on the RAI obtained in step 210.

230 The UMM 120, 130 provides the RAC to the radio network node 110. The RAC may be provided to the radio network node 110 in many different manners as described, for example, with reference to FIGS. 2b and c.

Figure 2B:
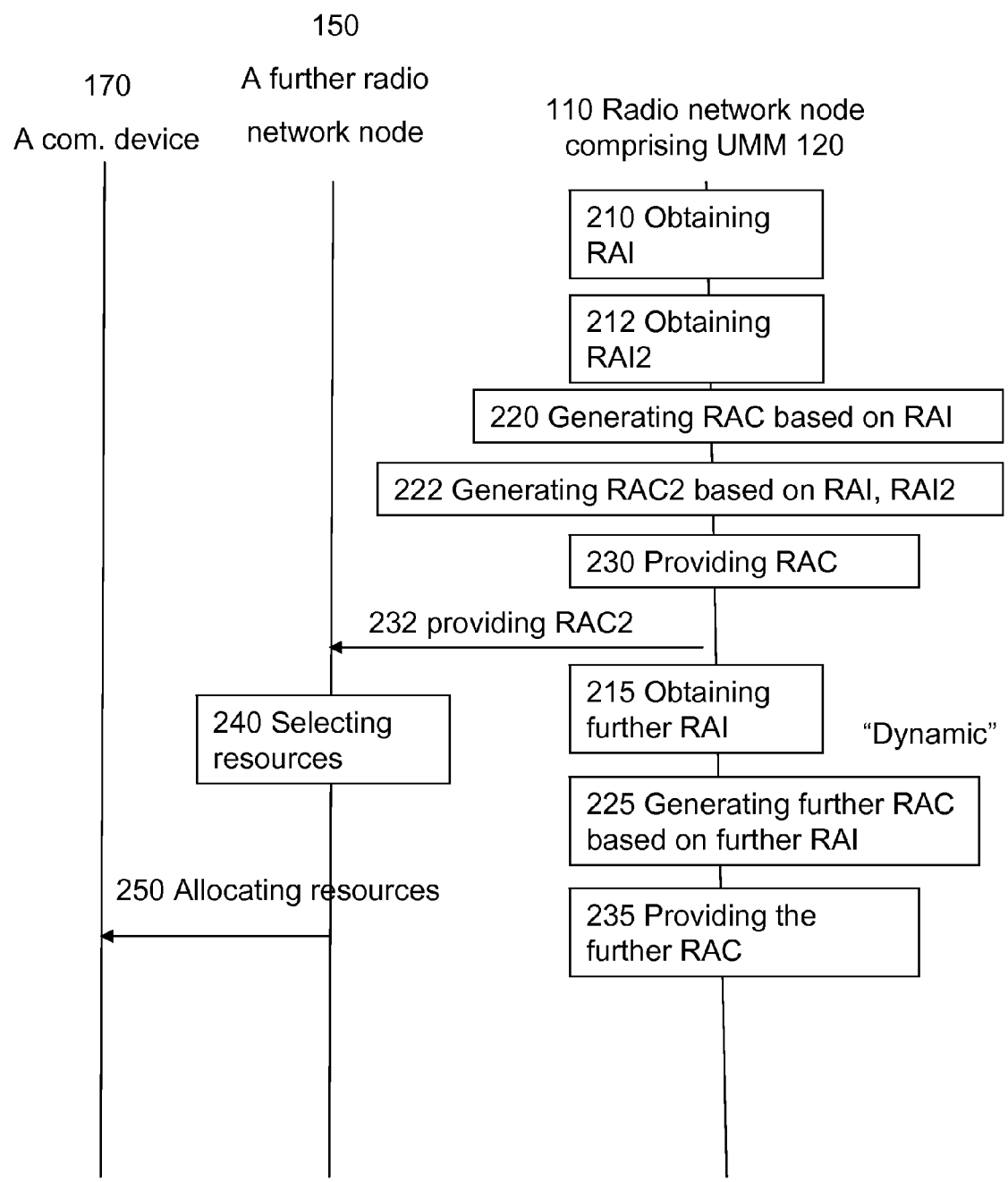
Figure 2C:
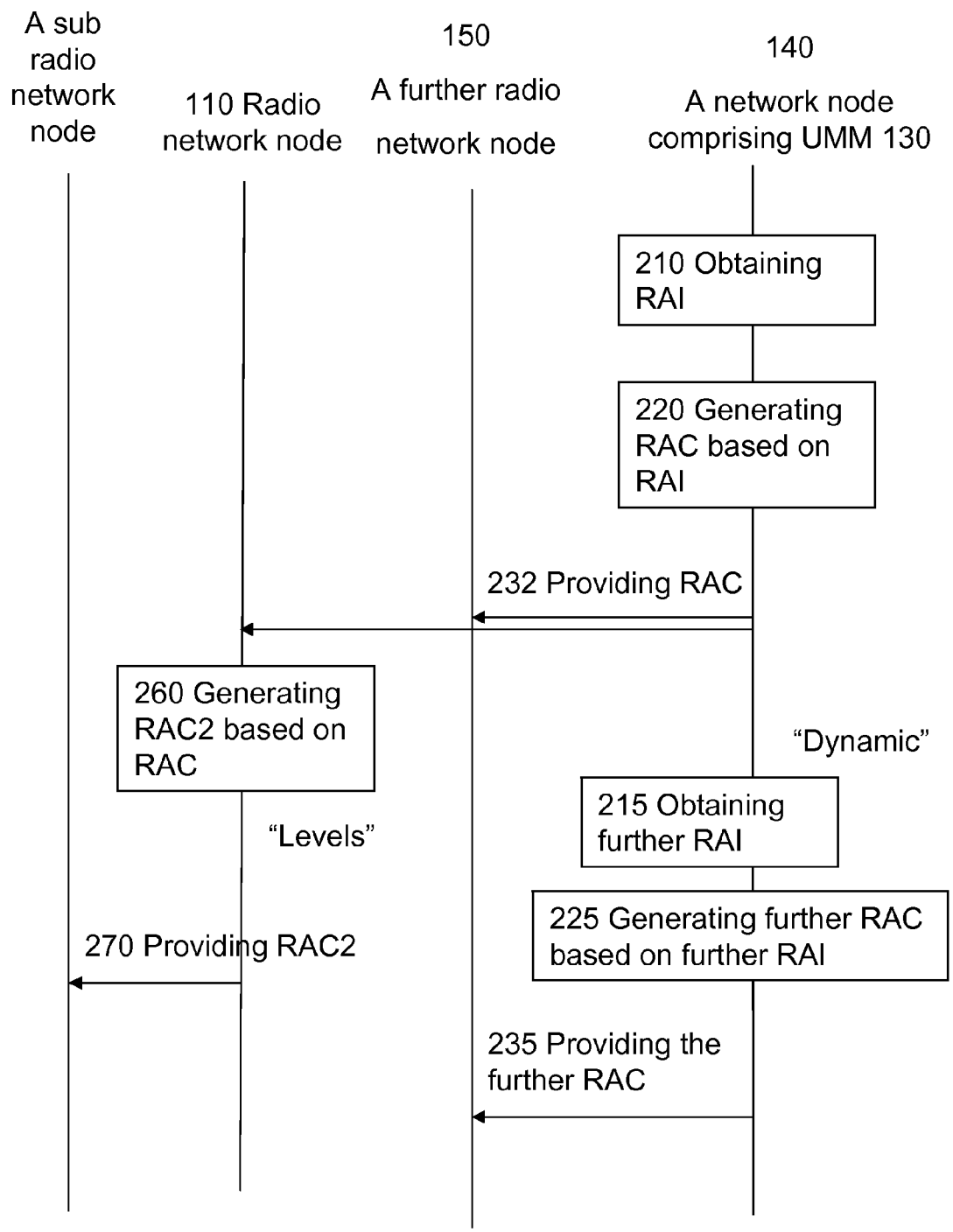

A dynamic control of the UCCHR, such as PUCCH resource, may enable efficient resource utilization, which is described in the following with reference to FIGS. 2b and 2c. The method illustrated in FIGS. 2b and 2c is dynamic in the sense that the RAC is updated every once in a while. For example, it may be updated periodically or when it is detected that the interference level exceeds some predefined threshold value. It may also be that the threshold value varies with time, for example, to compensate for different number of users during different times of a time period, such as a day, a week, a month or the like.

Figure 12:
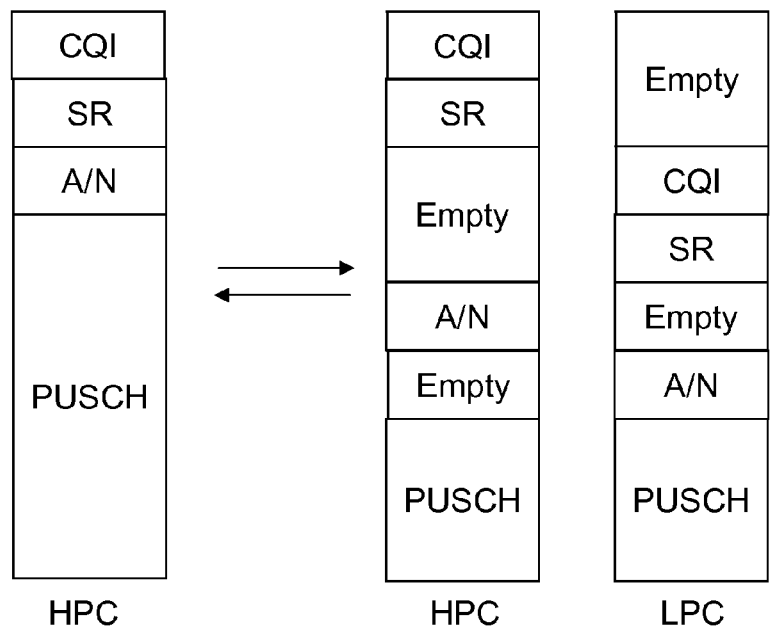
FIG. 12 shows efficient configurations for the PUCCH resources.

A UMM, sometimes referred to as PUCCH resource controller herein, in a high power cell eNB (reference 110 in FIG. 1) is contemplated in FIG. 2b. With an X2 interface (or some other interface) available between a low power cells (reference 150 in FIG. 1) and the high power cell, it is possible to exchange signalling between nodes and control the PUCCH resource allocation jointly. In this embodiment the controlling functionality is situated in the high power cell eNB, constituting a PUCCH Resource Controller (UMM) and with a cell coverage area including at least one low power cell eNB. The UMM is responsible for assigning and revoking PUCCH resources to/from all or some of the cells in the area. The benefit of the dynamic resource control is illustrated in FIG. 12. In case the interference towards the low power cell is tolerable or if there is no users in the low power cell (which could very well often be the case, since the range of a low power cell is very limited), the high power cell can apply a PUCCH allocation as illustrated in the left part of the figure. PUCCH region is efficiently used and the data carrying PUSCH region is maximized. To protect the low power cells against intolerable interference, an allocation according to the right figure would be applicable.

Note also that in the example of FIG. 2b, so far the UMM has been described to control the resources in one high power cell eNB area. It could of course also be so that the UMM is responsible for a larger area including several eNBs with both high and low power cells. A dynamic PUCCH can also be used in a network with same power cell eNBs deployed. Still, within this embodiment, X2 signalling is the mechanism for transferring the necessary information. In the description above the UMM is seen as a one level connection point for PUCCH resources. Especially in the case of applying a UMM in scenarios with same power cells (but other cases not excluded) it can also be seen within this embodiment that several levels of UMM can be applied. UMM is first applied between cells of the same power cells and then the resources used in that process is in turn controlled by another UMM function that cater for resources also towards cells with higher power than the first group of said cells.

Now with reference to FIG. 2b, the following steps are illustrated therein. Notably, in some embodiments of the method of FIG. 2b, the order of the steps may differ from what is indicated in FIG. 2b and from what is indicated below. Since the radio network node 110 comprises the UMM 120 in this embodiment, only the radio network node 110 is referred to in the following for reasons of clarity and simplicity.

210 The radio network node 110 obtains RAI. The RAI may, for example, be preconfigured in the radio network node 110 or in the UMM 120, or the RAI may be measured by the radio network node 110 as described with reference to, for example, FIG. 2a.

212 The radio network node 110 obtains RAI2, i.e. a further RAI being valid for a further radio network node 150.

220, 222 The radio network node 110 generates a RAC and RAC2 based on RAI and RAI2. The RAC is to be applied to the radio network node 110 and the RAC2 is to be applied to the further radio network node 150. It may be preferred that the RAC and the RAC2 are based on both RAI and RAI2. Expressed differently, the radio network node 110 generates, for each of said at least a further radio network node 150, a corresponding further RAC based on one or more of the corresponding RAI. Each of the corresponding further RAC indicates UCCHR to be used by each of said at least a further radio network node 150.

230 The radio network node 110 provides the RAC, For example, the radio network node selects resources as indicated in the RAC.

232 The radio network node 110 provides the RAC2 to the further radio network node 150. For example, the radio network node sends the RAC2 to the further radio network node 150.

215 The radio network node 110 obtains further RAI, i.e. RAI3. The RAI3 is obtained in order to obtain updated resource allocation information to replace the RAI obtained in the step 210.

225 The radio network node 110 generates further RAC, i.e. RAC3, based on the further RAI.

235 The radio network node 110 provides the further RAC. For example, the radio network node 110 applies the further RAC to itself.

Steps 215. 225 and 235 provide functionality for repetitively (and/or periodically) updating and providing the RAC to the radio network node. Similar steps may be implemented to update and provide RAC2 to the further radio network node 150.

240 The further radio network node 150 selects resources, for example UCCHR as listed be below.

250 The further radio network node 150 allocates the resources, selected in the step 240 to a communication device 170.

In another example, with reference to FIG. 2c, when the UMM is comprised in the network node 140, such as an OAM system or node, there might be situations when there is no X2 interface between the radio network nodes, making it impossible to exchange inter-node information in a fast manner. Lack of X2 is e.g. likely for a deployment of CSG cells such as home eNBs, user controlled femto cells etc. Without X2, the UMM could as well be situated as part of the OAM system. The functionality is intended to be similar as compared to the UMM described in the previous embodiment, different in the aspect that the information might not be as detailed and up to date as compared to an X2 signalling solution. This implementation is hence less dynamic and not as effective in the resource utilization. Similar information is requested in the UMM as for embodiment 1, but with this implementation it would be transferred (or sent) to the OAM system. As for the example in FIG. 2b, also it may be so that the UMM is controlling a wider area than a high power eNB.

With a UMM situated as a part of the OAM system, it is likely that it is responsible for PUCCH resource handling in a larger area covering several eNBs.

Further, the dynamic PUCCH resource control in the (controlling) eNB makes the resource utilization more efficient, leading to higher user throughput and improved system capacity.

The steps, illustrated in FIG. 2c, may be performed in a different order than presented below and/or in the Figure. Note that the network node 140 comprises the UMM 130 in this embodiment. Therefore, for reasons of simplicity and clarity, only the network node 140 or the UMM 130 may have been referred to in the following description of the steps.

210 The network node 140 obtains RAI. The RAI may, for example, be preconfigured in the network node 140 or in the UMM 130, or the RAI may be measured by a radio network node 110, which in turn may provide the RAI to the network node 140 (not shown).

220 The network node 140 generates a RAC based on RAI. The RAC is to be applied to the radio network node 110 and a further radio network node 150.

232 The network node 140 provides the RAC to the further network node 150. For example, the network node 140 sends the RAC to the further network node 150. It may be that the network node 140 has obtained another RAI valid for the radio network node 110. Compare with steps 212, 222 and 232 in FIG. 2b. If this is the case, the network node 140 also sends another RAC to the radio network node 110.

215 The network node 140 obtains further RAI.

225 The network node 140 generates further RAC based on the further RAI.

235 The network node 140 provides the further RAC. For example, the network node 140 sends the further RAC to the further radio network node 150. Steps 215. 225 and 235 provide functionality for repetitively (and/or periodically) updating and providing the RAC to the network node. Similar steps may be implemented to update and provide RAC2 to the further network node 150. In more detail, in conjunction with step 215, additional RAI may be obtained, wherein the additional RAI is valid for the radio network node 110. Further, in conjunction with steps 225 and 235, additional RAC may be generated and send (provided) to the radio network node 110.

260 The radio network node 110 generates a RAC2 based on the other RAC of the step 232.

270 The radio network node 110 provides the RAC2 to a sub radio network node. The steps 260 and 270 provide functionality for managing different levels of UMMs as shown, for example, in FIG. 13.

Figure 3:
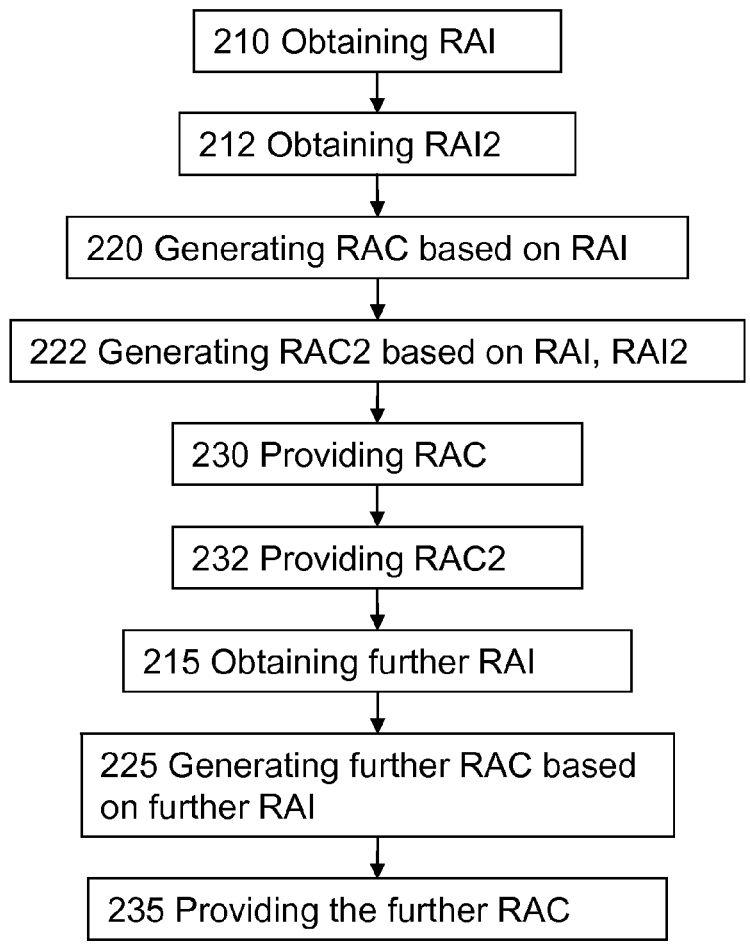
FIG. 3 shows a schematic flow chart of an embodiment of the method in the UMM for assigning uplink control channel resources to a radio network node.

With reference to FIG. 3, there is shown schematic flow chart of an embodiment of the method in an Uplink control channel resource Management Module 120, 130, referred to as "UMM", for assigning, to a radio network node 110, uplink control channel resources UCCHR for use in a uplink control channel, referred to as "UCCH", between the radio network node 110 and a communication device 160 A radio communication system 100 comprises the UMM 120, 130, the radio network node 110 and the communication device 160. The following steps may be performed. Notably, in some embodiments of the method the order of the steps may differ from what is indicated below.

210 The UMM 120, 130 obtains resource allocation information, referred to as "RAI". The resource allocation information may optionally comprise information indicative of use, conditions and resource regions on the uplink control channel and cell information of the radio network node.

220 The UMM 120, 130 generates a resource allocation command, referred to as "RAC", based on the RAI, wherein the RAC indicates UCCHR to be used by the radio network node.

230 The UMM 120, 130 provides (or sends/distributes/reports/forwards) the RAC to the radio network node 110.

The UCCH may be a physical uplink control channel, PUCCH. The radio communication system may be an LTE network. The radio network node may be an eNB.

In some embodiments of the method in the UMM 120, 130, the radio communication system 100 comprises at least a further radio network node 150. Further, the method may comprise the steps of 212 The UMM 120, 130 obtains, for each of said at least a further radio network node 150, corresponding RAI.

222 The UMM 120, 130 generates, for each of said at least a further radio network node 150, a corresponding further RAC based on one or more of the corresponding RAI. Each of the corresponding further RAC indicates UCCHR to be used by each of said at least a further radio network node 150. Accordingly, the RAC may be based on one or more of the corresponding RAI obtained in the step 212.

232 The UMM 120, 130 provides, for each of said at least a further radio network node 150, the corresponding further RAC to said at least a further radio network node 150.

In some embodiments of the method in the UMM 120, 130, the method further comprises the steps of 215 The UMM 120, 130 obtains 215 further RAI, and 225 The UMM 120, 130 generates a new RAC based on said further RAI, and 235 The UMM 120, 130 provides the new RAC to the radio network node if the new RAC differs from the RAC.

These steps enable dynamic resource allocation, i.e. for example the resource allocation may be different at different points in time. This may be advantageous, when for example the number of users, i.e. communication devices, in a cell varies heavily. Another example is when the interference varies, for instance due to deployment of additional cells/base stations/eNBs. With a dynamic resource allocation, it would be possible to adapt to such changes automatically.

In some embodiments of the method in the UMM 120, 130, the resource allocation information RAI comprises one or more of the following parameters
- region of the semi-static region of uplink UCCH used for CQI and SR transmission,
- reserved region for Ack/Nack
- indications of how much of the UCCHR are used i.e. the load,
- indications of the level of transmitted power on the used UCCHR,
- interference situation on UCCH resource blocks and potentially neighbouring resource blocks,
- an amount of intra-cell interference on UCCH orthogonality factor, and
- information about cell coverage areas including possible overlap in coverage between different cells. The information needed to be provided to the UMM, as listed above, is hence, e.g. the region of the semi-static region of the PUCCH (used for CQI and SR transmission) in the cells, the (statically or dynamically) reserved region used for A/N transmission. Further, load indications on these resources could also be beneficial, especially information on what resources that are not fully exploited and when. In embodiment 1 this information would be transferred via X2. Also RRC is a candidate protocol carrying this information, especially (but others not excluded) in scenario where relays are deployed in the network. In scenarios where X2 is not available (as described in embodiment 2 below) or for other reasons not considered appropriate for carrying this information to the UMM, also S1 interface or other interfaces/protocols could be used instead of X2 or RRC. Other information that may also be of interest to be available in the UMM include information of the interference situation on different resource blocks and also the PUCCH orthogonality within a cell (performance indicator may be decoding errors of the PUCCH reception etc.). The orthogonality factor could e.g. depend on the radio propagation environment of the users. Thus, the RAI is built up by the parameters above.

In some embodiments of the method in the UMM 120, 130, the UCCHR comprises one or more of:
- total UCCH resource region number of available resource blocks,
- region of the semi-static region of UCCH used for CQI and SR transmission,
- reserved region for Ack/Nack transmissions,
- load restriction—e.g. a maximum number of allocations per resource block,
- power restriction power resource block or per allocation,
- a preferred resource region within the total uplink control channel resource region,
- a non-preferred resource region with the total uplink control channel resource region that may only be used under certain circumstances, and
- preferred resources for QCI, SR or Ack/Nack transmission and resources that are available to be used.

As an example, the radio network node may begin to allocate resources within the preferred (or prioritized) resource region, such as a region of a resource block, when allocating UCCH resources to at least one communication device. The non-preferred resources regions may only be used, i.e. allocated to at least one the communication device, when the preferred resource region has been used (or consumed for allocation). It may be that the non-preferred resource region may be used when all of the preferred resource region has been used or when a fixed or dynamic portion of the preferred resource region has been used. Accordingly, as an example, certain circumstances may be that the number of communication devices in the cell (or communication devices camping on the radio network node) is greater than a specific amount of communication devices. The specific amount of communication devices may be predefined or dynamically determined.

Hence, the RAC is merely a command or message that comprises UCCHR which may be derived from the parameters defining RAI. The RAI may possibly be associated with several radio network nodes. For example, UCCHR may indicate a number of resource blocks (or portions thereof) which may be used by the radio network node. In addition, the UCCHR may indicate restrictions concerning the number of resource blocks. The restrictions may limit load, power or the like.

In some embodiments of the method in the UMM 120, 130, the radio network node 110 comprises the UMM 120. Optionally, the RAI is obtained via an S1, an X2 or OAM interface.

In some embodiments of the method in the UMM 120, 130, the radio communication system 100 further comprises a network node 140, comprising the UMM 130. The network node 140 may be a core network node, or OAM system node such as a Domain Manager or Network Element Manager. Optionally, the RAI is obtained via an S1 interface and/or the RAC is reported to the radio network node 110 via the/an S1 interface.

In some embodiments of the method in the UMM 120, 130, the step of obtaining 210 comprises receiving, from at least the radio network node 110, measurements on which the RAI is based.

In some embodiments of the method in the UMM 120, 130, the RAI is preconfigured in the UMM 120, 130. Expressed differently, a RAI is manually provided to the radio network node.

In some embodiments of the method in the UMM 120, 130, the RAC comprises information for instructing the radio network node to assign CQI, SR and/or A/N to respective regions of the UCCH such that overlap between CQI, SR and A/N of the UCCH and corresponding regions of a possibly interfering UCCH is reduced. It is to be understood that the overlap between regions of CQI, SR and/or A/N creates an interference level between the UCCH and the possibly interfering UCCH. It is desired that the interference level is below some threshold level, being indicative of an acceptable interference level. Preferably, the respective regions may be a resource block or a portion of a resource block.

Figure 5:
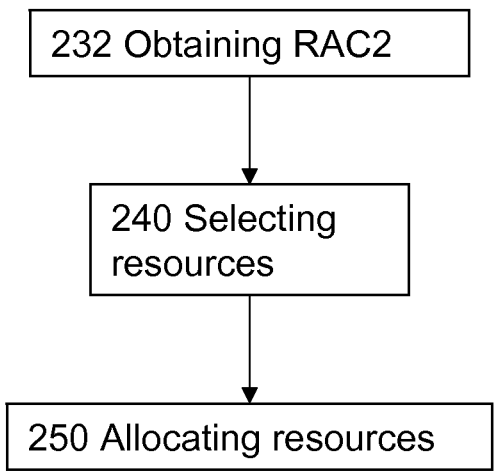
FIG. 5 shows a schematic flow chart of an embodiment of the method in the radio network node for allocating resources to a communication device.

FIG. 5 shows a schematic flow chart of an embodiment of the method in a radio network node 110, 150 for allocating resources to a communication device 160, 170. A radio communication system 100 comprises the radio network node 110, 150, the communication device 160, 170 and a UMM 120, 130. The following steps may be performed. Notably, in some embodiments of the method the order of the steps may differ from what is indicated below.

232 The radio network node 110, 150 obtains from the UMM 120, 130 a resource allocation command, RAC, wherein the RAC indicates UCCHR to be used by the radio network node 110, 150,

240 The radio network node 110, 150 selects resources to be allocated to the communication device based on the RAC, wherein the resources comprises a sub-set of the UCCHR, and

250 The radio network node 110, 150 allocates the resources to the communication device 160, 170. Optionally, the resources are allocated by means of an RRC command (using LTE terminology).

Figure 7:
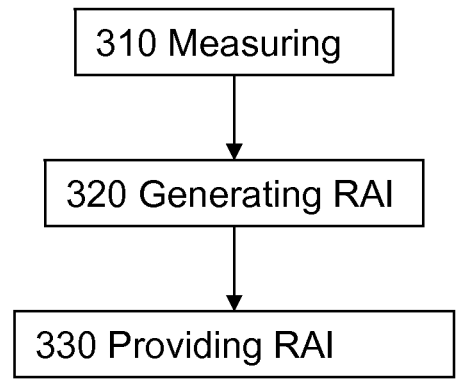
FIG. 7 shows a schematic flow chart of an embodiment of the method in the radio network node for providing, to a UMM, RAI for indicating UCCHR to be used in a uplink control channel.

FIG. 7 shows a schematic flow chart of an embodiment of the method in the radio network node 110, 150 for providing, to a UMM 120, 130, RAI for indicating UCCHR to be used in a uplink control channel, referred to as "UCCH", between the radio network node 110, 150 and a communication device 160. A radio communication system 100 comprises the radio network node 110, 150 and the UMM 120, 130. The following steps may be performed. Notably, in some embodiments of the method the order of the steps may differ from what is indicated below.

310 The radio network node 110, 150 measures (or detects) one or more of region of the semi-static region of uplink UCCH used for CQI and SR transmission, reserved region for Ack/Nack, indications of how much of the UCCHR are used (i.e. the load), indications of the level of transmitted power on the used UCCHR, interference situation on UCCH resource blocks and potentially neighbouring resource blocks, an amount of intra-cell interference on UCCH (orthogonality factor), and information about cell coverage areas including possible overlap in coverage between different cells,

320 The radio network node 110, 150 generates RAI based on one or more of the parameters, and

330 The radio network node 110, 150 provides, preferably via an S1 or X2 interface, RAI to the UMM 120, 130.

In some embodiments of the method in the radio network node 110, 150, the steps of measuring, generating and providing are performed periodically and/or triggered to be performed when 1 interference on the resource blocks used for uplink control channel is above a certain threshold, or 2 the number of users served by the node exceeds a certain number, or 3 the number of PUCCH errors exceeds a certain threshold and the like.

In some embodiments of the method in the radio network node 110, 150, the step of providing 330 is performed based on a criteria determined by the UMM 120, 130. For example, the UMM determines the UCCHR of its controlling cells, aiming at a sufficiently efficient resource allocation (i.e. reducing overhead), while still ensuring UCCH robustness and reliability.

Figure 9:
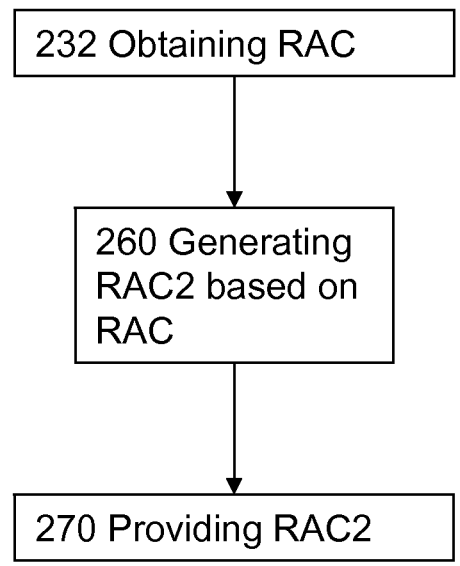
FIG. 9 shows a schematic flow chart of an embodiment of the method in the network node for assigning UCCHR to a sub network node.

FIG. 9 shows a schematic flow chart of an embodiment of the method in the network node 110 for assigning UCCHR to a sub network node. The UCCHR are to be used on a UCCH between the sub network node and any communication device camping on the sub network node. A radio communication system 100 comprises the network node 110, the sub network node and a UMM 120. The following steps may be performed. Notably, in some embodiments of the method the order of the steps may differ from what is indicated below.

232 The network node 110 obtains from the UMM 120 an obtained resource allocation command, referred to as "RAC", wherein the obtained RAC indicates UCCHR to be used by the network node 110. In some embodiments of the method in the network node 110, the network node may obtain further RAI from the femto cells (femto eNBs), shown in FIG. 13.

260 The network node 110 generates a new RAC based on the obtained RAC, wherein the new RAC indicates a selected set of UCCHR, which comprises a sub-set of the UCCHR indicated by the obtained RAC. If further RAI has been received in the step 232, it may be preferred to generate the new RAC based on the further RAI and the obtained RAC.

270 The network node 110 provides the new RAC to the sub network node. In this manner, the sub network node may allocated resources to said any communication device, wherein the resources to be allocated are selected from the selected set of UCCHR. See also, description in conjunction with FIG. 13, which shows several levels of UMMs.

Figure 4:
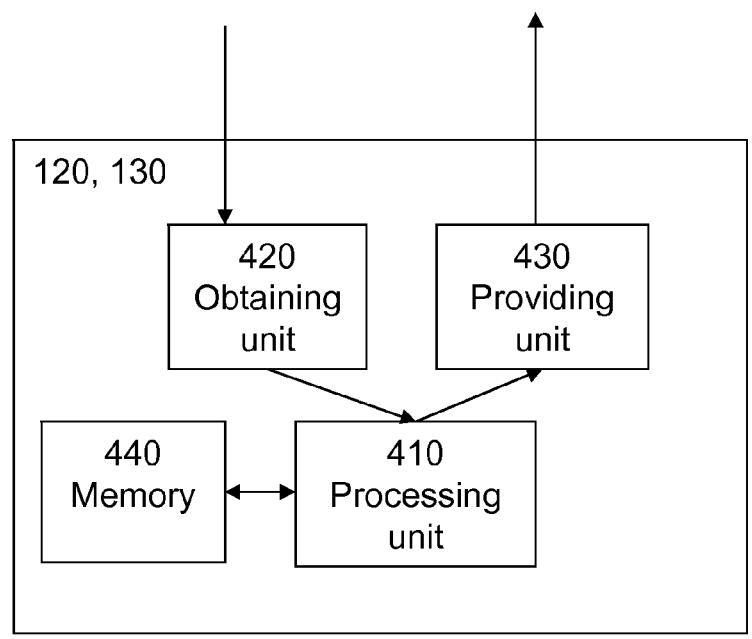
FIG. 4 shows a schematic block diagram of an embodiment of the UMM for assigning uplink control channel resources to a radio network node.

Now referring back to FIG. 4, in which there is shown an Uplink control channel resource Management Module 120, 130, referred to as "UMM", for assigning, to a radio network node 110, uplink control channel resources UCCHR for use in a uplink control channel, referred to as "UCCH", between the radio network node 110 and a communication device 160, wherein a radio communication system 100 comprises the UMM 120, 130, the radio network node 110 and the communication device 160. The UMM 120,130 may comprise an obtaining unit 420 configured to obtain resource allocation information, referred to as "RAI", a processing unit 410 configured to generate a resource allocation command, referred to as "RAC", based on the RAI, wherein the RAC indicates UCCHR to be used by the radio network node, and a providing unit 430 configured to provide sending distributing reporting forwarding the RAC to the radio network node 110. The UMM may further comprise a memory 440 connected to the processing unit 410. A computer program product implementing embodiments of the method of FIG. 3 may be stored on the memory, which may be any type of memory as is known in the art.

In some embodiments of the UMM 120, 130, the radio communication system 100 comprises at least a further radio network node 150. Further, the obtaining unit 420 is configured to obtain, for each of said at least a further radio network node 150, corresponding RAI. The processing unit 410 is further configured to generate, for each of said at least a further radio network node 150, a corresponding further RAC based on the RAI. The corresponding further RAC indicates UCCHR to be used by each of said at least a further radio network node 150. Accordingly, the RAC may be based on one or more of the corresponding RAI obtained. The providing unit 430 is further configured to provide, for each of said at least a further radio network node 150, the corresponding further RAC to said at least a further radio network node 150.

In some embodiments of the UMM 120, 130, the obtaining unit is further configured to obtain further RAI, and the processing unit is further configured to generate a new RAC based on said further RAI. Furthermore, the providing unit is configured to provide the new RAC to the radio network node if the new RAC differs from the RAC.

In some embodiments of the UMM 120, 130, the resource allocation information RAI comprises one or more of the following parameters region of the semi-static region of uplink UCCH used for CQI and SR transmission,
reserved region for Ack/Nack
indications of how much of the UCCHR are used i.e. the load,
indications of the level of transmitted power on the used UCCHR,
interference situation on UCCH resource blocks and potentially neighbouring resource blocks,
an amount of intra-cell interference on UCCH orthogonality factor, and
information about cell coverage areas including possible overlap in coverage between different cells.

In some embodiments of the UMM 120, 130, the UCCHR comprises one or more of:
total UCCH resource region number of available resource blocks,
region of the semi-static region of UCCH used for CQI and SR transmission,
reserved region for Ack/Nack transmissions,
load restriction—e.g. a maximum number of allocations per resource block,
power restriction power resource block or per allocation,
a preferred resource region within the total uplink control channel resource region,
a non-preferred resource region with the total uplink control channel resource region that may only be used under certain circumstances, and
preferred resources for QCI, SR or Ack/Nack transmission and resources that are available to be used.

In some embodiments of the UMM 120, 130, the radio network node 110 comprises the UMM 120.

In some embodiments of the UMM 120, 130, the radio communication system 100 further comprises a network node 140, comprising the UMM 130. The network node 140 may be a core network node, or OAM system node such as a Domain Manager or Network Element Manager.

In some embodiments of the UMM 120, 130, the obtaining unit further is configured to receive, from at least the radio network node 110, measurements on which the RAI is based.

In some embodiments of the UMM 120, 130, the RAI is preconfigured in the UMM 120, 130. Expressed differently, a RAI is manually provided to the radio network node.

In some embodiments of the UMM 120, 130, the RAC comprises information for instructing the radio network node to assign CQI, SR and/or A/N to respective regions of the UCCH such that overlap between CQI, SR and A/N of the UCCH and corresponding regions of a possibly interfering UCCH is reduced. Preferably, the respective regions may be a resource block or a portion of a resource block.

In some embodiments of the present invention, there is provided a radio network node 110, 150, comprising a UMM as presented herein.

In some embodiments of the present invention, there is provided a network node 140, comprising a UMM as presented herein. The network node may be a core network node, OAM node or the like as described above.

Figure 6:
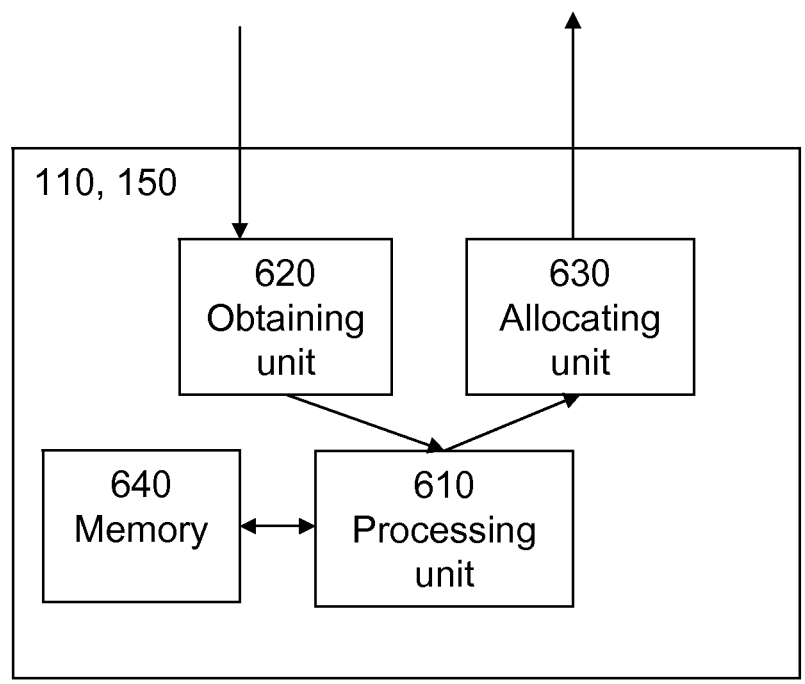
FIG. 6 shows a schematic block diagram of an embodiment of the radio network node for allocating resources to a communication device.

FIG. 6 shows a radio network node 110, 150 for allocating resources to a communication device 160, 170, wherein a radio communication system 100 comprises the radio network node 110, 150, the communication device 160, 170 and a UMM 120, 130. The radio network node 110, 150 may comprise an obtaining unit 620 configured to obtain from the UMM 120, 130 a resource allocation command, RAC, wherein the RAC indicates UCCHR to be used by the radio network node 110, 150, a processing unit 610 configured to select resources to be allocated to the communication device based on the RAC, wherein the resources comprises a sub-set of the UCCHR, and an allocating unit 630 configured to allocate the resources to the communication device 160, 170. The radio network node may further comprise a memory 640 connected to the processing unit 610. A computer program product implementing embodiments of the method of FIG. 5 may be stored on the memory, which may be any type of memory as is known in the art.

Figure 8:
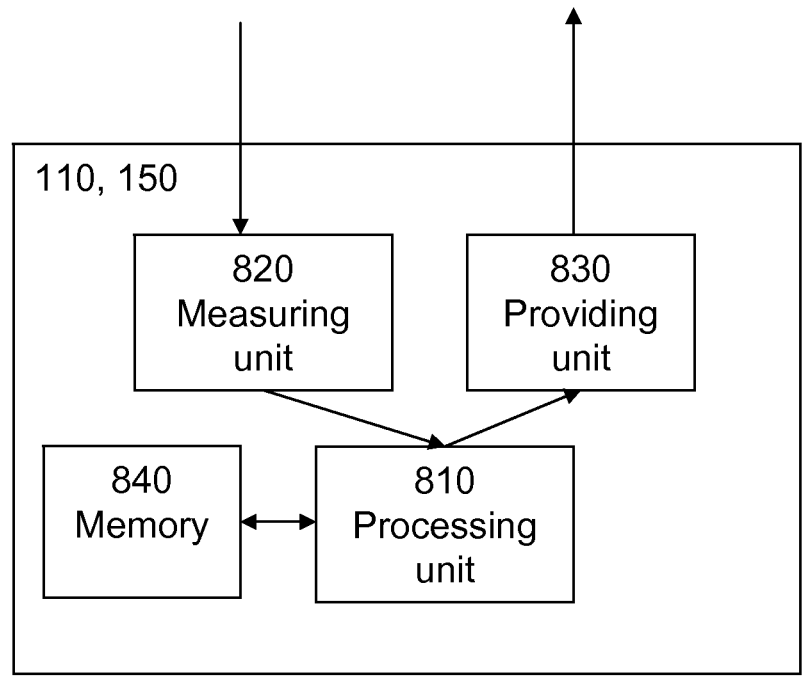
FIG. 8 shows a schematic block diagram of an embodiment of the radio network node for providing, to a UMM, RAI for indicating UCCHR to be used in a uplink control channel.

FIG. 8 shows a radio network node 110, 150 for providing, to a UMM 120, 130, RAI for indicating UCCHR to be used in a uplink control channel, referred to as "UCCH", between the radio network node 110, 150 and a communication device 160, wherein a radio communication system 100 comprises the radio network node 110, 150 and the UMM 120, 130. The radio network node 110, 150 may comprise a measuring unit 820 configured to measure parameters comprising one or more of region of the semi-static region of uplink UCCH used for CQI and SR transmission,
reserved region for Ack/Nack
indications of how much of the UCCHR are used (i.e. the load),
indications of the level of transmitted power on the used UCCHR,
interference situation on UCCH resource blocks and potentially neighbouring resource blocks,
an amount of intra-cell interference on UCCH (orthogonality factor), and information about cell coverage areas including possible overlap in coverage between different cells, a processing unit 810 configured to generate RAI based on one or more of the parameters, and a providing unit 830 configured to provide, preferably via an S1 or X2 interface, RAI to the UMM 120, 130. The radio network node may further comprise a memory 840 connected to the processing unit 810. A computer program product implementing embodiments of the method of FIG. 7 may be stored on the memory, which may be any type of memory as is known in the art.

In some embodiments of the radio network node 110, 150, the measuring unit, generating unit and providing unit are configured to measure, generate and provide periodically and/or triggered to measure, generate and provide, when (1)

interference on the resource blocks used for uplink control channel is above a certain threshold, or (2) the number of users served by the node exceeds a certain number, or (3) the number of PUCCH errors exceeds a certain threshold and the like.

In some embodiments of the radio network node 110, 150, the providing unit is configured to provide based on a criteria determined by the UMM 120, 130. For example, the UMM determines the UCCHR of its controlling cells, aiming at a sufficiently efficient resource allocation (i.e. reducing overhead), while still ensuring UCCH robustness and reliability.

Figure 10:
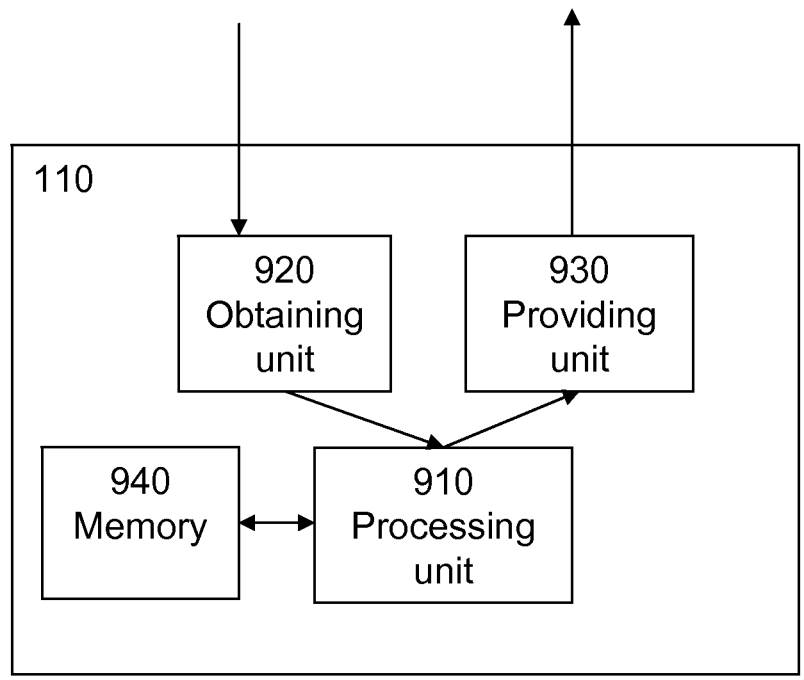
FIG. 10 shows a schematic block diagram of an embodiment of the network node for assigning UCCHR to a sub network node.

FIG. 10 shows a network node 110, 710 for assigning UCCHR to a sub network node 150. A radio communication system 100 may comprise the network node 110, the sub network node 150, 720 and a UMM 120, 130. The network node 110, 710 may comprise an obtaining unit 920 configured to obtain, from the UMM 120, 130 an obtained resource allocation command, referred to as "RAC", wherein the obtained RAC indicates UCCHR to be used by the network node 110, 710, a processing unit 910 configured to generate a new RAC based on the obtained RAC, wherein the new RAC indicates a selected set of UCCHR for use by the sub network node 150, 720, which comprises a sub-set of the UCCHR indicated by the obtained RAC, and a providing unit 930 configured to provide the new RAC to the sub network node 150, 720. The network node may further comprise a memory 940 connected to the processing unit 910. A computer program product implementing embodiments of the method of FIG. 9 may be stored on the memory, which may be any type of memory as is known in the art.

In some embodiments, a solution for introducing re-use (or coordination) of the PUCCH resource between the cells is presented. The re-use of PUCCH resources may be configured by the OAM system or some other core network node. However, to make the solution more efficient and adaptive to low power cell activity, it may be beneficial if the high power eNB includes functionality to make it responsible for allocating the PUCCH resources within its cell coverage area.

Further, it is, in some embodiments, introduced a dynamic PUCCH resource control method where the handling of PUCCH resources is placed in a PUCCH Resource controller (also referred to as "UMM"). The UMM may be comprised in the high power eNB, but may also be comprised in a separate node of the radio network or in the core network. The cells in the area of the UMM may request PUCCH resources from the UMM and hand them back when not used. The signalling between the cells and the UMM is expected to be carried over the inter eNB interface X2, but it could potentially also be done over other interfaces such as S1 (core network signalling).

Figures 11A, 11B:
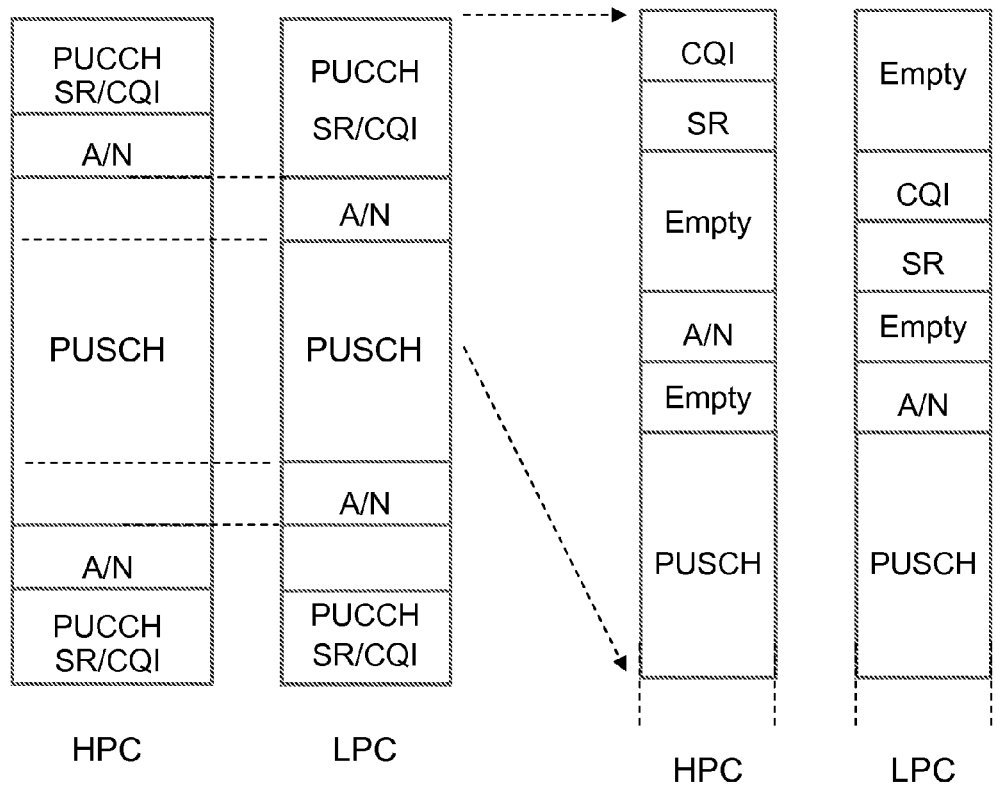
FIGS. 11a and 11b shows an example of how reuse of PUCCH resources may be implemented.

Such a reuse scheme is illustrated in FIGS. 11a and 11b. The PUCCH in LTE is situated at the bandwidth edges, and consists of a semi-static region carrying Channel Quality Indicator (CQI) reports and Scheduling Requests (SR). Within the semi-static region, resources are reserved for Ack/Nacks (A/N)—indicating (non-) successful reception on data transmitted on the DL shared channel (PDSCH). This configuration may be implemented (semi-) statically as a part of the OAM system, i.e. the OAM comprises the UMM. A resource re-allocation may, for example, be performed when new cells are deployed.

In FIG. 11a and 11b, there is shown an illustration with a high power and low power base station HPC, LPC (for example Macro/Pico, respectively) example of how the reuse of the PUCCH resources may look like in a heterogeneous deployment suffering from intolerable interference. To the left is an overview and the right figure shows a more detailed configuration. Advantageously, low power cells in a heterogeneous deployment will not suffer from intolerable macro cell interference in the control channel region.

To ensure that the PUCCH is robust in a heterogeneous network deployment a reuse of the PUCCH resource may be needed between cells with different output power.

A static configuration of these resources means that even if no users are currently active in the low power cell, PUCCH resources are still reserved for transmission, hence not utilized by the high power cell though no users in the low power cell suffer from high power cell users interference.

In FIG. 12, there is shown, to the left, an efficient PUCCH configuration for the high power cell, HPC, (e.g. a macro cell) in case interference to the low power cells, LPC (e.g. a Pico cell) does not need consideration. To the right, in FIG. 12, there is illustrated an example of a PUCCH configuration in situations where the control channel in both cells (both the Macro and Pico cells, i.e. HPC and LPC, respectively) need to be protected towards intolerable interference from each other.

Scheduling may further enhance the functionality of the present solution. Scheduling may configured such that users in the vicinity of a micro cell are not scheduled such that the users introduce heavy interference to the micro cell (LPC). This may be especially applicable to the Ack/Nack region of the PUCCH.

Figure 13:
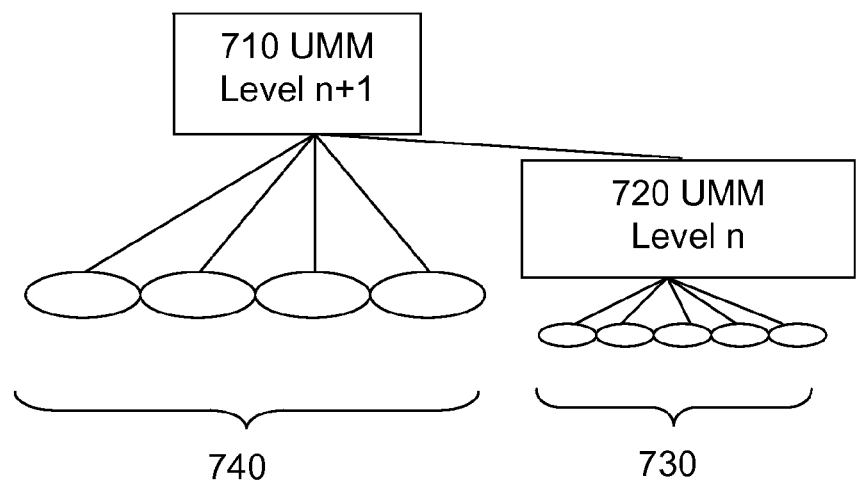
FIG. 13 shows an example in which several levels of UMMs are used.

In FIG. 13, there is shown an example where several levels of UMMs 710, 720 are used. In this example, there is one UMM 720 managing several femto cells 730 (towards the right in the figure). This "UMM level n" 720 is then controlled by another "UMM level n+1" 710. The "UMM level n+1" also handles a set of macro cells 740 (to the left in the Figure). In some embodiments, the UMM 710 may be comprised in one of the macro cells 740, i.e. the radio network node managing said one of the macro cells.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in an Uplink control channel resource Management Module (UMM) for assigning, to a radio network node, uplink control channel resources (UCCHR) for use in an uplink control channel (UCCH) between the radio network node and a communication device, wherein a radio communication system comprises the UMM, the radio network node, and the communication device, and wherein the UMM comprises a processing unit connected to memory, the method comprising:

obtaining resource allocation information (RAI);
generating a resource allocation command (RAC) based on the RAI, wherein the RAC indicates UCCHR to be used by the radio network node; and
providing the RAC to the radio network node;
wherein the RAI indicates one or more of:
a portion of a semi-static region of the UCCH used for Channel Quality Indicator (CQI) and Scheduling Request (SR) transmissions; and
a reserved region of the UCCH that is used for Acknowledgment/Negative Acknowledgment (ACK/NACK) transmissions;
wherein each region of the UCCH refers to a resource block or a portion of a resource block; and
wherein the RAC comprises information instructing the radio network node to assign at least one of CQI, SR, and ACK/NACK to respective regions of the UCCH that do not substantially overlap with corresponding regions of another, interfering UCCH; and wherein the UCCHR indicates a number of resource blocks or portions thereof.

2. The method of claim 1, wherein the radio communication system comprises one or more further radio network nodes, the method further comprising, for each of said one or more further radio network nodes:

obtaining corresponding RAI;

generating a corresponding further RAC based on one or more of the corresponding RAI, wherein the corresponding further RAC indicates UCCHR to be used by the further radio network node; and providing the corresponding further RAC to the further radio network node.

3. The method of claim 1, further comprising:

obtaining further RAI;

generating a new RAC based on said further RAI; and providing the new RAC to the radio network node, if the new RAC differs from the RAC.

4. The method of claim 1, wherein the RAI further indicates one or more of:

how much of the UCCHR are used;

the level of transmitted power on the used UCCHR;

an interference situation on UCCH resource blocks and potentially neighboring resource blocks;

an amount of intra-cell interference on the UCCH; and information about cell coverage areas including overlap in coverage between different cells.

5. The method of claim 1, wherein the UCCHR comprises one or more of:

a total UCCH resource region, a load restriction;

a power restriction per resource block or per allocation;

a preferred resource region within the total UCCH resource region; and a non-preferred resource region with the total UCCH resource region that may only be used under certain circumstances.

6. The method of claim 1, wherein the radio network node comprises the UMM.

7. The method of claim 6, wherein the RAI is obtained via an S1, an X2 or an OAM interface.

8. The method of claim 1, wherein the radio communication system further comprises a network node, said network node comprising the UMM.

9. The method of claim 8, wherein at least one of:

the RAI is obtained via an S1 interface; and the RAC is reported to the radio network node via an S1 interface.

10. The method of claim 1, wherein said obtaining comprises receiving, from at least the radio network node, measurements on which the RAI is based.

11. The method of claim 1, wherein the RAI is preconfigured in the UMM.

12. A method in a radio network node for allocating resources to a communication device, wherein a radio communication system comprises the radio network node, the communication device and an Uplink control channel (UCCH) resource Management Module (UMM), wherein the UMM comprises a processing unit connected to memory, the method comprising:

obtaining, from the UMM, a resource allocation command (RAC) that indicates uplink control channel resources (UCCHR) to be used by the radio network node;

selecting, based on the RAC, a sub-set of the UCCHR to be allocated to the communication device; and allocating said sub-set to the communication device;

wherein the RAI indicates one or more of:

a portion of a semi-static region of the UCCH used for Channel Quality Indicator (CQI) and Scheduling Request (SR) transmissions; and a reserved region of the UCCH that is used for Acknowledgment/Negative Acknowledgment (ACK/NACK) transmissions;

wherein each region of the UCCH refers to a resource block or a portion of a resource block; and wherein the RAC comprises information instructing the radio network node to assign at least one of CQI, SR, and ACK/NACK to respective regions of the UCCH that do not substantially overlap with corresponding regions of another, interfering UCCH; and wherein the UCCHR indicates a number of resource blocks or portions thereof.

13. A method in a radio network node for providing resource allocation information (RAI) to an Uplink control channel resource Management Module (UMM) in order to assist the UMM assign uplink control channel resources (UCCHR) to the radio network node, the UCCHR comprising resources of an uplink control channel (UCCH) between the radio network node and a communication device, wherein a radio communication system comprises the radio network node, the UMM, and the communication device, and wherein the UMM comprises a processing unit connected to memory, the method comprising:

measuring parameters comprising one or more of:

which regions of a semi-static region of the UCCH are used for carrying Channel Quality Indication (CQI) and Scheduling Request (SR) transmissions;

which region of the UCCH is reserved for Acknowledgement/Negative Acknowledgment (ACK/NACK) transmissions;

how much of the UCCHR are used;

the level of transmitted power on the used UCCHR;

interference on UCCH resource blocks;

an amount of intra-cell interference on UCCH; and information about cell coverage areas including overlap in coverage between different cells;

generating the RAI based on one or more of the measured parameters; and providing the RAI to the UMM circuit.

14. The method of claim 13, wherein said measuring, generating and providing are performed at least one of:

periodically; and responsive to being triggered by:

interference on the resource blocks used by the UCCH rising above a certain threshold;

the number of users served by the radio network node exceeding a certain number; or the number of UCCH errors exceeding a certain threshold.

15. The method of claim 13, wherein said providing is performed based on a criteria determined by the UMM.

16. A method in a network node for assigning uplink control channel resources (UCCHR) to a sub network node, wherein a radio communication system comprises the network node, the sub network node, and an Uplink control channel resource Management Module (UMM), and wherein the UMM comprises a processing unit connected to memory, the method comprising:

obtaining, from the UMM, a resource allocation command (RAC) that indicates UCCHR to be used by the network node, wherein the RAC comprises information instructing the radio network node to assign at least one of CQI, SR, and ACK/NACK to respective regions of the UCCH that do not substantially overlap with corresponding regions of another, interfering UCCH; and generating, based on the obtained RAC, a new RAC that indicates a selected set of UCCHR, the selected set comprising a sub-set of the UCCHR indicated by the obtained RAC; and providing the new RAC to the sub network node.

17. An Uplink control channel resource Management Module (UMM) configured to assign uplink control channel resources (UCCHR) to a radio network node, the UCCHR comprising resources of an uplink control channel (UCCH) between the radio network node and a communication device, wherein a radio communication system comprises the UMM, the radio network node and the communication device, the UMM comprising:

an obtaining unit configured to obtain resource allocation information (RAI);

a processing unit configured to generate a resource allocation command (RAC) based on the RAI, wherein the RAC indicates UCCHR to be used by the radio network node, and wherein the processing unit is connected to memory; and a providing unit configured to provide the RAC to the radio network node;

wherein the RAI indicates one or more of:
  a portion of a semi-static region of the UCCH used for Channel Quality Indicator (CQI) and Scheduling Request (SR) transmissions; and
  a reserved region of the UCCH that is used for Acknowledgment/Negative Acknowledgment (ACK/NACK) transmissions;
  wherein each region of the UCCH refers to a resource block or a portion of a resource block; and wherein the RAC comprises information instructing the radio network node to assign at least one of CQI, SR, and ACK/NACK to respective regions of the UCCH that do not substantially overlap with corresponding regions of another, interfering UCCH; and wherein the UCCHR indicates a number of resource blocks or portions thereof.

18. The UMM of claim 17, wherein the UMM is part of the radio network node.

19. The UMM of claim 17, wherein the radio communication system further comprises a network node, and wherein UMM is part of the network node.

20. A radio network node configured to allocate resources to a communication device, wherein a radio communication system comprises the radio network node, the communication device and an Uplink control channel resource Management Module (UMM), and wherein the UMM comprises a processing unit connected to memory, the radio network node comprising an obtaining unit configured to obtain, from the UMM, a resource allocation command (RAC) that indicates uplink control channel resources (UCCHR) to be used by the radio network node;

a processing unit configured to select, based on the RAC, a sub-set of the UCCHR to be allocated to the communication device; and an allocating unit configured to allocate said sub-set to the communication device;

wherein the RAI indicates one or more of:
  a portion of a semi-static region of the UCCH used for Channel Quality Indicator (CQI) and Scheduling Request (SR) transmissions; and
  a reserved region of the UCCH that is used for Acknowledgment/Negative Acknowledgment (ACK/NACK) transmissions;
  wherein each region of the UCCH refers to a resource block or a portion of a resource block; and wherein the RAC comprises information instructing the radio network node to assign at least one of CQI, SR, and ACK/NACK to respective regions of the UCCH that do not substantially overlap with corresponding regions of another, interfering UCCH; and wherein the UCCHR indicates a number of resource blocks or portions thereof.

21. A radio network node for providing resource allocation information (RAI) to an Uplink control channel resource Management Module (UMM) circuit in order to assist the UMM assign uplink control channel resources (UCCHR) to the radio network node, the UCCHR comprising resources of an uplink control channel (UCCH) between the radio network node and a communication device, wherein a radio communication system comprises the radio network node, the UMM, and the communication device, and wherein the UMM comprises a processing unit connected to memory, the radio network node comprising:

a measuring unit configured to measure parameters indicating one or more of:
  which regions of a semi-static region of the UCCH are used for carrying Channel Quality Indication (CQI) and Scheduling Request (SR) transmission;
  which region of the UCCH is reserved for Acknowledgement/Negative Acknowledgment (ACK/NACK) transmissions;
  how much of the UCCHR are used;
  the level of transmitted power on the used UCCHR;
  interference on UCCH resource blocks;
  an amount of intra-cell interference on UCCH; and
  information about cell coverage areas including overlap in coverage between different cells;

a processing unit configured to generate the RAI based on one or more of the measured parameters; and a providing unit configured to provide the RAI to the UMM.

22. A network node configured to assign uplink control channel resources (UCCHR) to a sub network node, wherein a radio communication system comprises the network node, the sub network node, and an Uplink control channel (UCCH) resource Management Module (UMM), and wherein the UMM comprises a processing unit connected to memory, the network node comprising:

an obtaining unit configured to obtain, from the UMM, a resource allocation command (RAC) that indicates UCCHR to be used by the network node;

a processing unit configured to generate, based on the obtained RAC, a new RAC that indicates a selected set of UCCHR for use by the sub network node, the selected set comprising a sub-set of the UCCHR indicated by the obtained RAC; and a providing unit configured to provide the new RAC to the sub network node;

wherein the RAI indicates one or more of:
  a portion of a semi-static region of the UCCH used for Channel Quality Indicator (CQI) and Scheduling Request (SR) transmissions; and
  a reserved region of the UCCH that is used for Acknowledgment/Negative Acknowledgment (ACK/NACK) transmissions;
  wherein each region of the UCCH refers to a resource block or a portion of a resource block; and wherein the RAC comprises information instructing the radio network node to assign at least one of CQI, SR, and ACK/NACK to respective regions of the UCCH that do not substantially overlap with corresponding regions of another, interfering UCCH; and wherein the UCCHR indicates a number of resource blocks or portions thereof.

\* \* \* \* \*

UNITED STATES PATENT AND TRADEMARK OFFICE
CERTIFICATE OF CORRECTION

PATENT NO. : 9,113,453 B2
APPLICATION NO. : 13/125420
DATED : August 18, 2015
INVENTOR(S) : Moberg et al.

It is certified that error appears in the above-identified patent and that said Letters Patent is hereby corrected as shown below:

Title Page

On Page 2, in item (56), under "OTHER PUBLICATIONS", in Column 2, Line 6, delete "WG1 Metting" and insert -- WG1 Meeting --, therefor.

On Page 2, in item (56), under "OTHER PUBLICATIONS", in Column 2, Line 7, delete "Chpaters" and insert -- Chapters --, therefor.

On Page 2, in item (56), under "OTHER PUBLICATIONS", in Column 2, Line 9, delete "WG1 Metting" and insert -- WG1 Meeting --, therefor.

In the Specification

In Column 5, Line 14, delete "shows an" and insert -- show an --, therefor.

In Column 7, Line 40, delete "Steps 215." and insert -- Steps 215, --, therefor.

In Column 8, Line 35, delete "Steps 215." and insert -- Steps 215, --, therefor.

In Column 12, Line 42, delete "node may" and insert -- node may be --, therefor.

In Column 15, Line 56, delete "Nacks (A/N)" and insert -- Nack (A/N) --, therefor.

In Column 15, Line 62, delete "In FIG. 11a and 11b," and insert -- In FIGS. 11a and 11b, --, therefor.

In the Claims

In Column 17, Line 32, in Claim 5, delete "region," and insert -- region; --, therefor.

Signed and Sealed this
Tenth Day of May, 2016

Michelle K. Lee
*Director of the United States Patent and Trademark Office*

CERTIFICATE OF CORRECTION (continued)
U.S. Pat. No. 9,113,453 B2

In Column 18, Line 44, in Claim 13, delete "UMM circuit." and insert -- UMM. --, therefor.

In Column 19, Line 54, in Claim 20, delete "comprising" and insert -- comprising: --, therefor.

In Column 20, Line 15, in Claim 21, delete "(UMM) circuit" and insert -- (UMM) --, therefor.